Feb. 9, 1926.
J. TATGE
SCRAPER
Filed Oct. 22, 1923
1,572,824
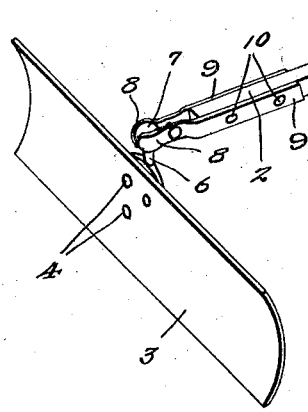
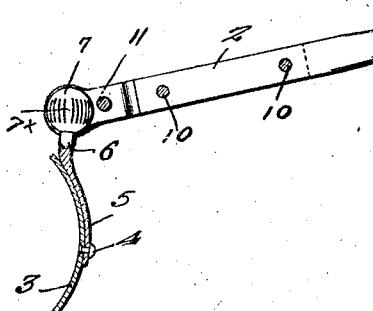
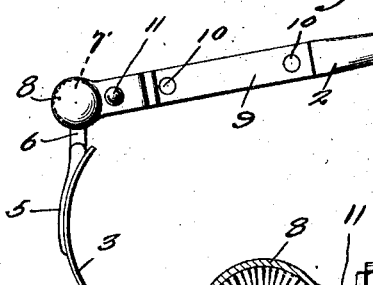
John Tatge INVENTOR
BY Victor J. Evans ATTORNEY Patented Feb. 9, 1926.

1,572,824

UNITED STATES PATENT OFFICE.

JOHN TATGE, OF WHITE CITY, KANSAS.

SCRAPER.

Application filed October 22, 1923. Serial No. 670,167.

*To all whom it may concern:*

Be it known that I, JOHN TATGE, a citizen of the United States, residing at White City, in the county of Morris and State of Kansas, have invented new and useful Improvements in Scrapers, of which the following is a specification.

The object of my said invention is the provision of a tool designed to be used to advantage in the cleaning of cement floors, side walks and other floors and streets, and also designed to be used after adjustment in the manner of a hoe in cleaning draining ditches, filling sewer ditches, preparing sweet potato rows, pulling grain back in a grain wagon from a thresher spout and pulling snow from a flat roof, as well as in numerous other connections.

Among other elements the scraper comprises a blade that is curved or concavo-convex in the direction of its width, this blade constituting the chief feature of the scraper inasmuch as when the scraper is used to clean a floor that has slush and water on it, the water will splash forwardly from the curve, and at the same time slush or mud will be prevented from sticking to the scraper. The curved blade reaches to the bottom of the slush and raises the same forwardly.

Another important feature of the invention resides in the handle and the peculiar and advantageous manner of connecting the blade to the handle. For instance, the blade is susceptible of being adjusted to an angle so that one corner of the blade will be ahead for the penetration of crust when the scraper is used for the removal of ice or snow adhering to a walk or floor. Again the handle is susceptible of adjustment to convert the scraper into a hoe-like device. The adjustable handle also adapts the device to be used to advantage by persons of different heights.

To the attainment of the foregoing, the invention consists in the improvement as hereinafter described and definitely claimed.

In the accompanying drawings, forming part of this specification:—

Figure 1 is a perspective of my novel scraper,

Figure 2 is a longitudinal central section of the same.

Figure 3 is a detail plan view showing the side of the blade opposite to that shown in Figure 1.

Figure 4 is an enlarged cross-section taken through the ball and socket joint of the device.

Figure 5 is a detail view showing the device adjusted to form a hoe-like tool.

Similar numerals of reference designate corresponding parts in all of the views of the drawings.

The handle 1 of the device is of wood, and the forward portion of the handle is preferably of rectangular cross-section as designated by 2.

In addition to the handle the device comprises a blade 3, preferably of steel, and of about the proportional length illustrated and of curvilinear or concavo-convex form in cross-section. Arranged against the convex side of the blade 3 and fixed to the blade by rivets 4 or other appropriate means is the flattened portion 5 of a shank 6, the rear end of which is shaped to form a ball 7. The said ball 7 is disposed and retained and movable in a socket disposed slightly in front of the forward end of the handle 1, the said socket being formed by concavo-convex resilient members 8 at the forward ends of metallic straps 9 which are fixedly connected at 10 to the opposite sides of the forward handle portion 2. At 11 is a headed and threaded bolt that extends through the straps 9 slightly in advance of the forward end of the handle, and at 12 is a nut mounted on the said bolt and disposed at the opposite side of the handle with reference to the head of the bolt. Manifestly by tightening the nut 12 the ball 7 may be adjustably fixed in the socket formed as described with a view to adjustably fixing the blade relative to the handle for any one of the uses to which the device is adapted to be put.

The ball 7 is preferably notched or grooved as designated by 7× to lessen the liability of the ball casually turning under strain.

I would also have it understood that it is within the purpose of my invention to connect the blade 3 at its back directly to the handle 1, In addition to the practical advantages herein before ascribed to my novel device, it will be noted that the device is simple and sturdy in construction, and is therefore inexpensive and at the same time well adapted to withstand the rough usage to which devices of corresponding character are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as the future practice of the invention various changes and modifications may be made such as fall within the scope of my invention as defined in my appended claim.

Having described my invention, what I claim and desire to secure by Letters-Patent, is:—

A tool of the character described comprising a concavo-convex cross sectional elongated blade, a shank secured to the convex side of said blade midway its ends and terminating beyond the upper longitudinal edge thereof in a ball, a handle, straps secured to one end of said handle and terminating in concavo-convex resilient members in a manner to form a socket for receiving the ball, said ball having a circumferential series of spaced notches, with each notch disposed substantially at right angles to the length of the socket and being adapted to lessen the liability of the ball casually turning in the socket.

In testimony whereof I affix my signature.

JOHN TATGE.